United States Patent [19]

Mück et al.

[11] 3,852,230

[45] Dec. 3, 1974

[54] IMPREGNATING COMPOSITIONS FOR FIBROUS SHEET MATERIALS FROM POLYURETHANE AND OLEFIN COPOLYMER

[75] Inventors: Eduard Mück, Otrokovice; Jaroslav Strachota, Veseli nad Moravou; Josef Horák, Gottwaldov, all of Czechoslovakia

[73] Assignee: Statni vyzkumny ustav Kozedelny, Gottwaldov, Czechoslovakia

[22] Filed: Sept. 2, 1971

[21] Appl. No.: 177,493

[30] Foreign Application Priority Data
Oct. 14, 1970 Czechoslovakia .................. 6906-70

[52] U.S. Cl............. 260/28, 117/161 KP, 161/170, 260/29.4 UA, 260/29.2 TN, 260/29.6 R, 260/29.6 NR, 260/29.6 XA, 260/30.4 N, 260/32.6 N, 260/30.8 DS
[51] Int. Cl............................................ C08h 13/06

[58] Field of Search .. 260/29.6 R, 29.6 NR, 29.2 N, 260/2.5 N, 29.2 TN, 28

[56] References Cited
UNITED STATES PATENTS

| | | | |
|---|---|---|---|
| 3,100,721 | 8/1963 | Holden ...................... | 260/29.6 NR |
| 3,190,847 | 6/1965 | Mitchell et al. ............. | 260/29.6 NR |
| 3,427,192 | 2/1969 | Bolinger ...................... | 260/29.6 NR |
| 3,567,499 | 3/1971 | Klebert et al. ............. | 260/29.6 NR |
| 3,639,157 | 2/1972 | Wunder et al. ............. | 260/29.6 NR |

Primary Examiner—Harold D. Anderson
Attorney, Agent, or Firm—Murray Schaffer

[57] ABSTRACT

Impregnating compositions for impregnating flexible sheet materials of a fibrous character, the composition being a mixture of elastomeric material and copolymeric material that imparts pliability and softness to the impregnated fibrous material and in which the copolymeric material is an olefinic copolymer.

3 Claims, No Drawings

IMPREGNATING COMPOSITIONS FOR FIBROUS SHEET MATERIALS FROM POLYURETHANE AND OLEFIN COPOLYMER

BACKGROUND OF THE INVENTION

This invention relates to impregnating compositions. More particularly it relates to impregnating compositions for impregnating flexible sheet material of a fibrous character and which impart pliability and softness to be impregnated fibrous material. Still more particularly, the invention relates to mixtures of elastomeric material and polymeric material suitable for impregnating flexible sheet materials on substrates of fibrous character and in which the polymeric material is formed from lower olefin monomers, that is, those containing 2 to 4 carbon atoms in their chains and substituted olefinic monomers wherein the substituent groups are higher linear alkyl groups, that is, those containing 4 to 20 carbon atoms in their chain or cyclic radicals having the ability to combine with an alkyl radical.

It is generally known to impregnate flexible sheet materials by means of elastomers in the water or organic solvent systems. The flexible sheet materials may be various mats made of natural, animal and vegetable fibres, of a mixture thereof with synthetic fibres, or may be made of synthetic fibres alone, the mats being either woven, knitted or even non-woven. Examples of useful mats are disclosed in U.S. Pat. application Ser. No. 593,289, now U.S. Pat. No. 3,607,609.

The flexible sheet materials impregnated in the above mentioned manner are comparatively rigid, especially when containing a higher content of the impregnating substances as solids. To remove the undesired rigidity of the flexible sheet materials, it is necessary to choose those conditions of processing which result in a compromise between the impregnating substance content and the rigidity.

In accordance with this invention, a solution to this problem is achieved by use of modified impregnation systems of elastomers either in water or in organic solvent medium. To these elastomeric systems a certain proportion of low-molecular polymers or copolymers of olefins are admixed so as to desirably influence the pliability of the impregnated flexible sheet materials. As a result, extraordinary values of pliability and softness are achieved with flexible sheet materials.

In accordance with the invention, an impregnating composition comprises a mixture of elastomeric material and copolymeric material, the copolymeric material being formed from (a) olefinic monomers having two to four carbon atoms in the carbon chain and (b) olefinic monomers having the general formula:

(I)

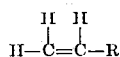

wherein R is a radical selected from the group consisting of linear alkyl radicals containing 4 to 20 carbon atoms in the carbon chain and cyclic radicals having the ability to combine with an alkyl radical. The content of the olefinic monomer of formula (I) in the copolymer is in a range of from 1 to 20 molar percent, the molecular weight of the copolymer being in the range of from 400 to 3,000 determined by standard ebulioscopic and cryoscopic methods. Examples of the higher linear alkyls ranging from $C_4$ to $C_{20}$, are butyl-, hexyl-, decyl- or hexadecyl and the like. Examples of the cyclic systems are cyclohexyl-, phenyl-, alkylphenyl- and the alpha-methylstyrene radical. As employed in this specification and in the claims, a cyclic radical having the ability to combine with an alkyl radical includes radicals derived from aromatic compounds with one or two benzene rings such as styrene and vinylnaphthalene and radicals derived from cycloaliphatic compounds wherein the cyclic portion of the molecule contains five to eight carbon atoms, such as vinylcyclopentane, vinylcyclohexane, vinylcyclohexane and vinylcyclooctane and the like.

A great advantage is obtained by using the low-molecular weight copolymers of olefins in organic solvent systems, as a component of these systems, in the form of water dispersions. The water contained in dispersion of these copolymers brings about gelling of the elastomers. The copolymers of the dispersions act at the same time as a protective colloid which results in a stabile micro-gel. When using this micro-gel system for impregnation, excellent micro-capillar structures are achieved in the impregnated flexible sheet materials which substantially increases their sorption and desorption properties.

In the copending application Ser. No. 177,500 of the same inventors filed even date herewith, now abandoned, and assigned to the same assignees coating compositions are disclosed. The disclosure of the aforementioned application is incorporated herein by reference.

Useful organic solutions for the elastomeric material include dimethylformamide and dimethylsulfoxide, tetrahydrofurone and mixtures of these with acetone and benzene and the like. Generally, enough solvent is employed to at least dissolve the elastomeric material. However, as a practical matter, in solutions of elastomeric material in solvent, the solutions may contain about 5 to about 20 percent by weight of elastomeric material based on the total weight of the elastomeric material and solvent.

Generally, the impregnating compositions of this invention are produced simply by mixing the constituents in the desired amounts and room temperature (about 20° C.). However, where necessary, heat can be employed to bring about proper mixing. In this regard, the mixture may be heated to just below its decomposition temperature, if necessary. Usually, temperatures in a range of about 10° C. to about 35° C. are sufficient to provide a homopolymeric mixture.

On the other hand, it has been found that best results are secured when using 70 percent aqueous dispersions of the above mentioned copolymers in water. The dispersion may be added up to the amount of 12 percent, by weight, based on the weight of the elastomers contained in the impregnation system. Moreover, it is to be understood that mixtures of one or more copolymers or elastomers can be employed in the practice of the invention.

An impregnation composition according to the invention may be successfully used in the textile industry, in the paper making industry, in the garment industry and especially for the manufacture of synthetic leathers as well as in other industries where impregnated flexible sheet materials find their place.

In order to illustrate the present invention, the following illustrative examples are set forth. In the examples all parts and percents are by weight unless otherwise stated.

EXAMPLE 1.

A non-woven textile mat prepared of polyester and viscose fibres was immersed into an impregnation system containing 25 percent solids. The system comprises 70 parts by weight of a water dispersion of polyurethane, 30 parts by weight of a polyacrylate type elastomer, 40 parts by weight of an ammonia solution of a styrene and maleic acid anhydride copolymer, 15 parts by weight of a copolymer of isobutylene with n-dodecene, having mean molecular weight of 1,500, and 3 parts by weight of a water dispersion of ureaformaldehyde resin.

The textile non-woven mat was impregnated with the mentioned system, the excess impregnating material pressed off between two squeegee rollers to leave a deposit of solids in the final product of about 30 percent of the total impregnated matter. Afterwards, the majority of the water content was removed from the nonwoven textile mat by pressing it between two rollers followed by drying at the temperature of 115° C. for a period of from 3 to 5 minutes.

The thus prepared mat of non-woven textile material is then buffed and used for further processing. The impregnated material was extremely pliable and soft.

EXAMPLE 2.

A non-woven sheet material, made of cellulose, was impregnated by immersion into a bath of total solids content of 25 percent. The bath contained 60 parts by weight of styrene-butadiene-acrylonitrile type elastomer, 25 parts by weight of butadiene-acrylonitrile type elastomer, 2.5 parts by weight of urea-formaldehyde precondensate containing 75 percent of monomethylol-urea and dimethylol-urea, 30 parts by weight of a polymerization product of isobutylene with alpha-methylstyrene of mean molecular weight 1,000 and 3 parts by weight of an ammonia solution of the ammonium salt of an ethylene and maleic acid copolymer. The bath is a water system. The sheet material was extremely pliable and soft.

EXAMPLE 3.

A non-woven mat, prepared of collagen and polypropylene fibres was impregnated by immersing it into an impregnation bath having the total solids content of 17 percent. The bath contained the following components: 80 parts by weight of polyurethane elastomer Estane 5714 (Trademark of the B. F. Goodrich Company, Akron, Ohio), 15 parts by weight of maleic acid anhydride and styrene, 5 parts by weight of a copolymer of isobutylene with n-dodecene having an average molecular weight of 1,200 and the appropriate amount of dimethylformamide. After the mat was impregnated the excess impregnation system was removed between two squeegee rollers to leave a solids content in the final product of 40 percent of the total impregnated matter. Solvent is washed step-wise from the impregnated mat using water, whereby coagulation is effected and micro-structure is formed. When the solvent was washed off the mat was dried for a period of 3 minutes at the temperature of 115° C. It was extremely soft and pliable.

Estane 5714 is a polyester urethane of the type described in U.S. Patent No. 2,899,411. As such, it comprises the reactive product of hydroxyl poly (tetramethylene oxide), butanediol-1,4, and diphenyl methane-p,p'-diisocyanate. It has a Shore Hardness of 80A, a low tack at elevated temperatures, and a Brookfield viscosity of 600–1200 cps.; and it also exhibits excellent low-temperature flexibility.

Impregnation may be obtained by immersion, spraying, vacuum deposition and other connection means.

EXAMPLE 4.

A non-woven textile material made of polyester and polypropylene fibres was processed in the same manner as described in Example 1 except that instead of 15 parts by weight of copolymer of isobutylene with n-dodecene having an average molecular weight of 2,000, eight parts by weight of copolymer of isobutylene with alpha-styrene having an average molecular weight of 1,500 are used.

The elastomeric material and the copolymeric material can be employed in a range of from about 100 parts of elastomers to about 5 to 50 parts copolymers and preferably about 15 to 25 parts of copolymers.

The present invention presents many advantages. For example, the noted compositions of this invention can be made with relatively inexpensive and readily available materials by simple procedures which do not require elaborate equipment and result in greatly improved products. Numerous other advantages will be apparent to those skilled in the art.

It is to be understood that many variations of this invention may be made without departing from the spirit and scope thereof and that the disclosed embodiments are merely illustrative. Consequently, this invention is not to be limited except as defined in the appended claims.

What is claimed:

1. An aqueous liquid composition for impregnating flexible sheet materials of fibrous character consisting essentially of a mixture of about 100 parts of a polyurethane made from hydroxyl poly (tetramethylene oxide), butanediol-1,4, and diphenyl methane—p,-p'—diisocyanate to about 5–50 parts of a copolymer having a molecular weight of from about 400 to 3,000 and formed from (a) about 1–20 molar percent of an olefinic monomer having two to four carbon atoms and (b) about 99 to 80 molar percent of a second olefinic monomer having the general formula:

(I) 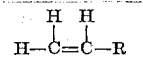

wherein R is a radical selected from the group consisting of linear $C_{4-20}$ alkyl radicals and carbo-cyclic radicals having the ability to combine with an alkyl radical, said olefinic monomers consisting essentially of hydrocarbon units.

2. An impregnating composition as defined in claim 1 wherein the olefinic monomer of formula (I) is alphamethylstyrene.

3. An impregnating composition as defined in claim 1 in an aqueous dispersion containing 70 percent by weight of solids, based on the total weight of the dispersion.